(12) United States Patent
Roehm

(10) Patent No.: US 8,905,891 B2
(45) Date of Patent: Dec. 9, 2014

(54) HAND-HELD ELECTRIC TOOL HAVING A TRANSMISSION

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 13/823,196

(22) PCT Filed: Sep. 7, 2011

(86) PCT No.: PCT/EP2011/065464
§ 371 (c)(1),
(2), (4) Date: May 29, 2013

(87) PCT Pub. No.: WO2012/038255
PCT Pub. Date: Mar. 29, 2012

(65) Prior Publication Data
US 2013/0237367 A1    Sep. 12, 2013

(30) Foreign Application Priority Data

Sep. 22, 2010   (DE) .......................... 10 2010 041 172

(51) Int. Cl.
| F16H 3/44 | (2006.01) |
| B25B 21/00 | (2006.01) |
| B25F 5/00 | (2006.01) |
| B23B 45/00 | (2006.01) |

(52) U.S. Cl.
CPC *F16H 3/44* (2013.01); *B25F 5/001* (2013.01); *B23B 45/008* (2013.01)
USPC ........................................... 475/290; 173/47

(58) Field of Classification Search
None
See application file for complete search history.

(56) References Cited

U.S. PATENT DOCUMENTS

| 4,493,223 | A | 1/1985 | Kishi et al. |
| 5,019,023 | A | 5/1991 | Kurosawa |
| 5,550,416 | A | 8/1996 | Fanchang et al. |
| 6,105,450 | A | 8/2000 | Sasaki et al. |
| 7,121,361 | B2 | 10/2006 | Hara et al. |
| 7,537,064 | B2 * | 5/2009 | Milbourne et al. ............. 173/47 |
| 8,220,561 | B2 * | 7/2012 | Milbourne et al. ........... 173/216 |
| 8,381,831 | B2 * | 2/2013 | Sekino et al. ................... 173/48 |
| 8,708,861 | B2 * | 4/2014 | Inagaki et al. ................ 475/286 |
| 2012/0279738 | A1 * | 11/2012 | Tomayko et al. ............... 173/47 |
| 2012/0318547 | A1 * | 12/2012 | Milbourne et al. ............. 173/47 |

FOREIGN PATENT DOCUMENTS

| CN | 2936607 | 8/2007 |
| DE | 10 2009 020177 | 12/2009 |
| EP | 1 946 895 | 7/2008 |

OTHER PUBLICATIONS

International Search Report for PCT/EP2011/065464, dated Dec. 30, 2011.

* cited by examiner

*Primary Examiner* — Dirk Wright
(74) *Attorney, Agent, or Firm* — Kenyon & Kenyon LLP

(57) ABSTRACT

A hand-held electric tool has a transmission that is situated in a transmission housing, which transmission is able to be switched over, via an operable switching device, at least between a first gear having a high torque and a second gear having a low torque. At least one intermediate gear is assigned to the transmission for the gear switchover, in which the electric tool is not durably operable, the operable switching device being developed to enable a gear switchover between the first and the second gear via the at least one intermediate gear.

15 Claims, 5 Drawing Sheets

HAND-HELD ELECTRIC TOOL HAVING A TRANSMISSION

BACKGROUND OF THE INVENTION

1. Field of the Invention

The present invention relates to a hand-held electric tool having a transmission situated in a transmission housing, which is switchable at least between a first gear having a high torque and a second gear having a low torque, via an operable switching device.

2. Description of the Related Art

Such hand-held electric tools are known from the related art, in which an associated transmission is switchable between two or more gears. These transmissions have two or more transmission stages, one transmission stage associated with a specified fast gear, having a low torque, being put out of service or released by shifting a suitable switching element for switching into or out of this gear. In this case, the switching element is shifted over a switching range that is developed as a neutral transition position.

It is disadvantageous in the related art that the transmission of such electric tools under a load are not reliably able to be switched over, so that a user of these tools has to switch them off and on again after a corresponding switchover process, in order to finish the switchover process.

BRIEF SUMMARY OF THE INVENTION

It is therefore an object of the present invention to provide a new hand-held electric tool having a transmission, which is also able to be switched over reliably under load between a first gear having a high torque and a second gear having low torque.

The object is attained by a hand-held electric tool having a transmission situated in a transmission housing, which is switchable at least between a first gear having a high torque and a second gear having a low torque, via an operable switching device. At least one intermediate gear is assigned to the transmission for the gear switchover, in which the electric tool is not durably operable. The operable switching device is developed to enable a gear switchover between the first and second gear via the at least one intermediate gear.

Consequently, the present invention makes possible providing a hand-held electric tool having a transmission using which a comparatively large gear spread is able to be implemented and that even under load is able to be switched over reliably between the first and second gear.

According to one specific embodiment, the transmission is developed as a planetary transmission having at least one first, one second and one third planetary stage.

Thus a safe and robust transmission may be provided.

The operable switching device is preferably developed to switch over the planetary transmission by sequential deactivation of at least two planetary stages from the first to the second gear.

Thus the planetary transmission may be switched over from the first to the second gear in a simple manner.

The operable switching device is preferably developed to switch over the planetary transmission by sequential deactivation of at least two planetary stages from the first to the second gear.

Thus the planetary transmission may be switched over from the second to the first gear in a simple manner.

According to one specific embodiment, the operable switching device for activating and deactivating the second and third planetary stage has at least one first and one second locking wheel. These are preferably acted upon by each other via an associated spring element in the axial direction of the planetary transmission.

Thus, the present invention enables providing a safe and stable switching device, which may be implemented comparatively cost-effectively.

The operable switching device preferably has a switching element that is developed to make possible a shifting of the first or second locking wheel relatively to the second or first locking wheel in the axial direction of the planetary transmission against a spring force provided by the spring element.

Thus, a shifting of the first or second locking wheel is made possible in a simple manner.

The first locking wheel is preferably able to be shifted in the axial direction of the planetary transmission from a first to a second operating position. The first locking wheel, in its first operating position, which is associated with the first gear, is preferably connected torsionally fixed to an internal geared wheel associated with the second planetary stage as well as indirectly to the transmission housing, and in its second operating position, which is associated with the intermediate gear and the second gear, is connected torsionally fixed to a sun wheel associated with the first planetary stage and the internal geared wheel of the second planetary stage.

This enables a safe and reliable gear switchover between the first and the second gear via the intermediate gear.

The first locking wheel is preferably able to be shifted in the axial direction of the planetary transmission from a first to a second operating position. The first locking wheel, in its first operating position, which is associated with the first gear, is preferably connected torsionally fixed to an internal geared wheel associated with the second planetary stage as well as indirectly to the transmission housing, and in its second operating position, which is associated with the intermediate and the second gear, is connected torsionally fixed to a sun wheel associated with the first planetary stage and the internal geared wheel of the second planetary stage.

This enables a safe and reliable gear switchover between the first and the second gear via the intermediate gear.

According to one specific embodiment, the second locking wheel, in its second operating position, is connected torsionally fixed to a locking disk, which is fastened torsionally fixed and axially immovable in the transmission housing.

Thus, the present invention makes possible providing an uncomplicated and cost-effective locking disk for the torsionally fixed fastening of the second locking wheel in the transmission housing.

According to one specific embodiment, the first and the second locking wheel are fixed to each other, in the first and second gear of the planetary transmission, in a form-locking connection, which is fixed by a spring force provided by the spring element.

Thus, an implementation of the first and the second gear is made possible in a simple manner.

The first and the second locking wheel are at a distance from each other in the intermediate gear of the planetary transmission, preferably against a spring force provided by the spring element, in the axial direction of the planetary transmission.

Consequently, the intermediate gear is able to be implemented safely and reliably.

The first and the second locking wheel are situated in the first gear of the planetary transmission, preferably in a torsionally fixed manner. In the second gear of the planetary transmission, the first and the second locking wheel are situated preferably in a torsionally movable manner in the transmission housing.

Thus, the first and the second gear are able to be implemented in a simple manner.

According to one specific embodiment, the first locking wheel is situated in the intermediate gear of the planetary transmission in a torsionally movable manner in the transmission housing, and the second locking wheel is situated in the intermediate gear of the planetary transmission, preferably in a torsionally fixed manner in the transmission housing.

Consequently, the intermediate gear is able to be implemented safely and reliably.

The object named at the outset is also attained by a transmission for an electric device which is switchable at least between a first gear having a high torque and a second gear having a low torque, via an operable switching device. At least one intermediate gear is provided for the gear switchover, in which the electric device is not durably operable. The operable switching device is developed to enable a gear switchover between the first and the second gear via the at least one intermediate gear.

DETAILED DESCRIPTION OF THE INVENTION

Figure 1:
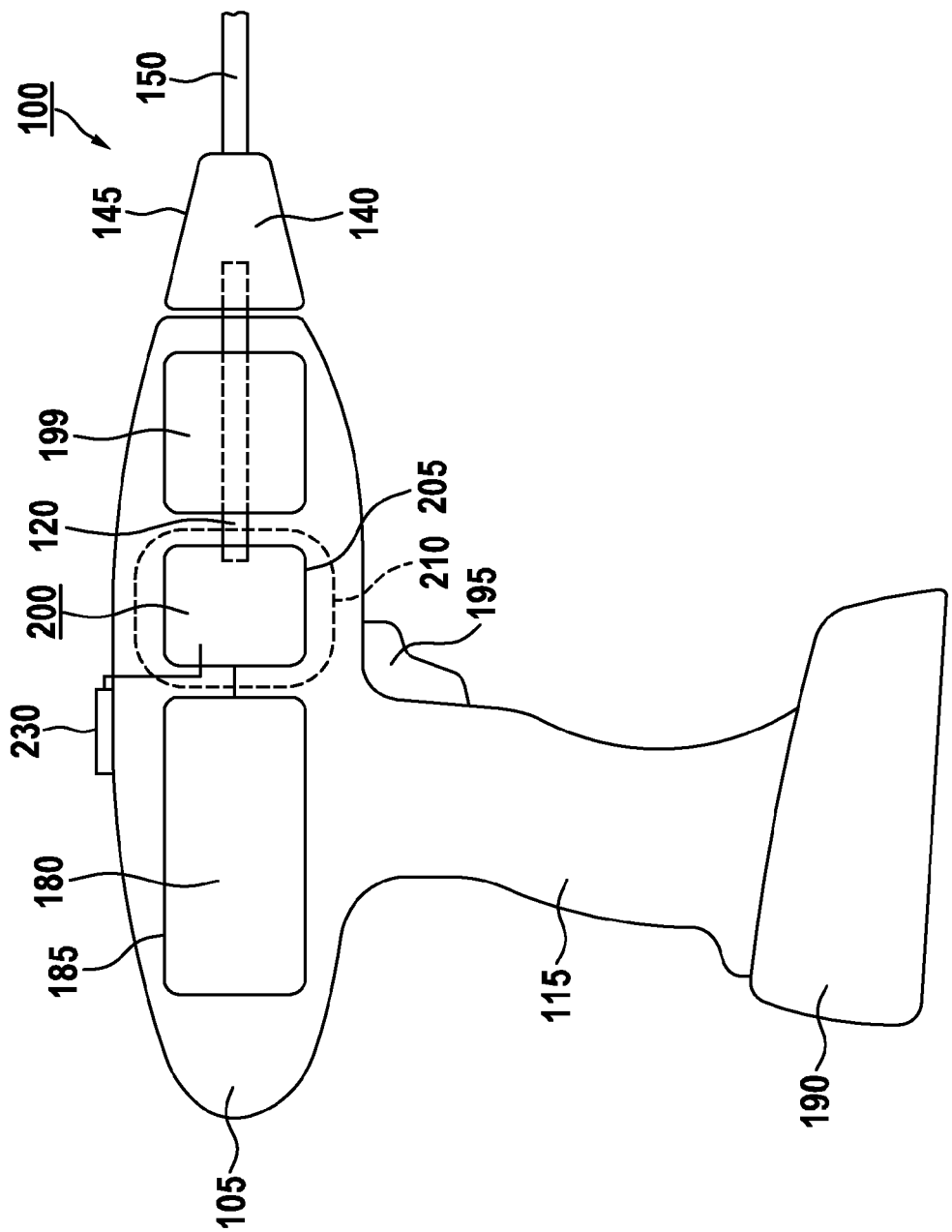
FIG. 1 shows a schematic view of a hand-held electric tool according to one specific embodiment.

FIG. 1 shows a hand-held electric tool 100, which has an housing 105 having a handle 115. According to one specific embodiment, hand-held electric tool 100 is able to be connected mechanically and electrically to a battery pack 190 for a power supply that is network independent. In FIG. 1, hand-held machine tool 100 is developed as a cordless drill/driver. It should be pointed out, however, that the present invention is not limited to battery pack rotary blow screwdrivers, but rather may be used for different electric tool applications in which a tool is put into rotation, e.g. in a cordless screwdriver, a cordless drilling screwdriver, a cordless rotary blow screwdriver, etc., independently of whether the electric tool is to be operated network-independently using a battery pack or dependent on a network.

In housing 105, there are situated an electric drive motor 180 supplied with current by battery pack 190 and a transmission 200. Drive motor 180 is connected via transmission 200 to a drive shaft 120, such as a drive spindle. Drive motor 180 is situated illustratively in a motor housing 185, and transmission 200 in a transmission housing 205, transmission housing 205 and motor housing 185 being situated in housing 105, for example.

Drive motor 180, for example, is able to be operated via a manual switch 195, that is, switched on and off, and may be of any desired motor type, for example, an electronically commutated motor or a DC motor. Drive motor 180 is preferably controllable or regulatable in such a way that both a reverse operation and specifications in regard to a desired rotational speed are able to be implemented. The method of functioning and the design of a suitable drive motor are sufficiently known from the related art so that, at this place, a detailed description may be omitted for the purpose of conciseness in the description.

According to one specific embodiment, transmission 200 is able to be switched over, using an associated operating element 230, via at least one intermediate gear, between at least one comparatively slow first gear having a high torque and a comparatively rapid second gear having a low torque. From here on, for the purpose of conciseness and simplicity of the description, we shall make reference only to the first gear, the second gear and the intermediate gear.

An optional torque coupling 199 is assigned illustratively to transmission 200. During operation of electric tool 100, transmission 200 is driven rotationally by driving motor 180. Transmission 200 will be described below in detail, with reference to a sectional view, shown enlarged in FIG. 2, of a section 210 of electric tool 100.

Transmission 200 has a tool holding fixture 140 assigned to it which, for example, has a drill chuck 145. This tool holding fixture 140 is used to accommodate a tool 150, and may be integrally formed to drive shaft 120 that is drivable via transmission 200, or it may be connected to it in an attached form.

Figure 2:
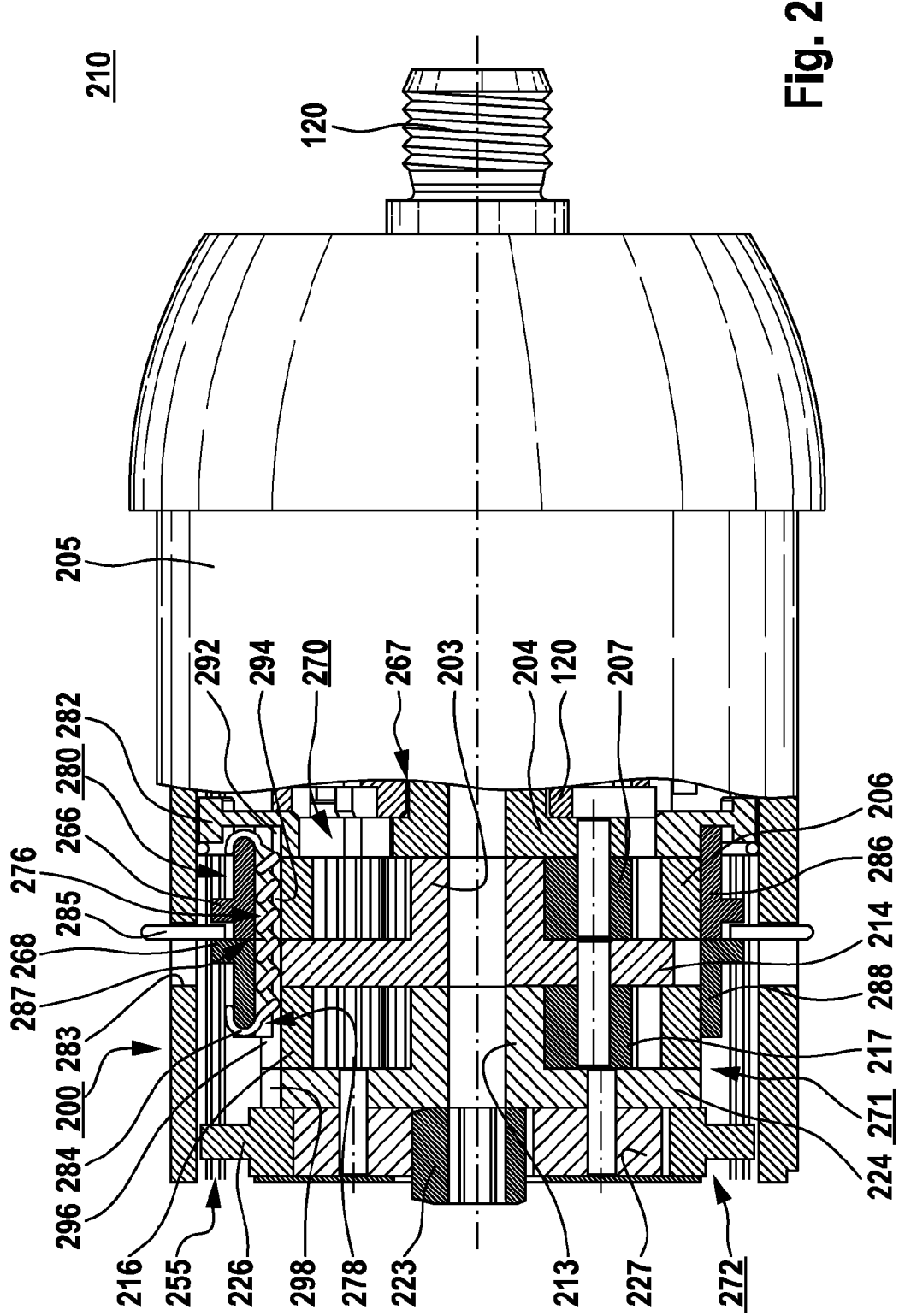
FIG. 2 shows a side view shown partially cut open of a section of the electric tool of FIG. 1 in operation of an exemplary planetary transmission in a slow gear having a high torque.

FIG. 2 shows section 210 of hand-held electric tool 100 of FIG. 1. It clarifies an exemplary embodiment of transmission 200, which is illustratively developed as a planetary transmission, and is shown in FIG. 2 in a first switching state in which the first gear of electric tool 100 of FIG. 1 is implemented.

Planetary transmission 200 illustratively has three gear or planetary stages situated in a housing interior 255 developed by the transmission housing: a first, rear stage 272, a second, middle stage 271 and a third, front stage 270. Front planetary stage 270 has, for example, a sun wheel 203, at least one planetary pinion 207, a sun wheel 204, equipped with a rotational tripping contour 267, that is not shown in greater detail, as well as an internal geared wheel 206 that is equipped with a radial locking geometry 294. Sun wheel 204 is, for instance, connected to drive spindle 120, via rotational tripping contour 267, that is not shown in grater detail, in order to drive it in a rotating manner in the operation of the electric tool 100. Middle planetary stage 271 has, for example, a sun wheel 213, at least one planetary pinion 217, a planet carrier 214, equipped with a rotational tripping contour 267, that is not shown in greater detail, as well as an internal geared wheel 216 that is equipped with a radial locking geometry 296. Planetary carrier 214 forms sun wheel 203 of front planet stage 270, sun wheel 203 being able to be fastened on planet carrier 214 in a suitable manner or may be developed on it in an attached form, or rather, as one piece. Rear planet stage 272, for instance, has a sun wheel 223, which is connected torsionally fixed to an associated motor shaft, at least one planet pinion 227, a planet carrier 224 provided with a radial locking geometry 298, as well as an axially and radially immovable internal geared wheel 226 situated in housing interior 205. Planetary carrier 224 forms sun wheel 213 of front planet stage 271, sun wheel 213 being able to be fastened on planet carrier 214 in a suitable manner or may be developed on it in an attached form, or rather, as one piece.

According to one specific embodiment, planetary transmission 200 is developed as a step-down gearing which is able to be switched over via the intermediate gear between the first gear and the second gear using a switching device 280. In this instance, operable switching device 280 is developed to switch over from the first into the second gear, by sequential deactivation of the front and middle planetary stages 270, 271, and to switch over from the second to the first gear by sequential activation of middle and front planetary stages 271, 270. Alternatively to this, planetary transmission 200 may be developed so that planetary transmission 200 is able to be switched over from the first into the second gear, by sequential deactivation of the rear and middle planetary stages 272, 271, and to be switched over from the second to the first gear by sequential activation of middle and rear planetary stages 271, 272.

Switching device 280 illustratively has a switching element 285, a locking disk 282, a first locking wheel 288, as second locking wheel 286 and an associated spring element 284. Switching element 285 is situated to be axially displaceable, for example, in an opening 283 of transmission housing 205 and connected, for example, with operating element 230 of FIG. 1, which may be developed as a slide locking, for example. Locking disk 282 has, for example, a radial locking geometry 292 and is fastened axially immovably and torsionally fixed, that is, radially immovable in transmission housing 205. The first and the second locking wheel 288, 286 are situated axially and radially displaceable in transmission housing 205, and are fixable to each other via a form-locking, axial connection 287, for instance, via a suitable tooth-tooth gap connection. Spring element 284 is used illustratively for acting upon the first and second locking wheel 288, 286 in the axial direction of transmission housing 205 or rather, of planetary transmission 200 against each other.

According to one specific embodiment, first locking wheel 288 has a radial locking counter-geometry 278 which is locked to locking geometry 296 of internal geared wheel 216 of middle planetary stage 271. Second locking wheel 286 has a radial locking counter-geometry 276 which is locked to locking geometry 294 of internal geared wheel 206 of front planetary stage 270. Beyond that, first locking wheel 288 may be formed onto internal geared wheel 216 and second locking wheel 286 may be formed onto internal geared wheel 206, or rather may be developed in one piece with it.

In the operation of electric tool 100 of FIG. 1 in first gear, second locking wheel 286 is held axially immovable by switching element 285 in a first (axially front in FIG. 2) operating position, so that its locking counter-geometry 276, that is locked to locking geometry 294 of internal geared wheel 206, is also locked to locking geometry 292 of locking disk 282. As illustrated, switching element 285 lies against an annular projection 266, provided at the outer circumference of second locking wheel 286. Consequently, second locking wheel 286 is fastened torsionally fixed to transmission housing 205 by locking disk 282, that is fastened on transmission housing 205, in its first operating position associated with the first gear, and thus also blocks internal geared wheel 206 in a torsionally fixed manner in transmission housing 205.

First locking wheel 288 is held, by spring element 284 via form-locking connection 287, to second locking wheel 286 in a first operating position (also axially in front in FIG. 2), so that switching element 285 is situated between annular projection 266 of second locking wheel 286 and an annular projection 268 provided at the outer circumference of first locking wheel 288. Consequently, second locking wheel 286 is situated in the first gear of electric tool 100 of FIG. 1 also rotationally fixed in transmission housing 205, and, via its locking counter-geometry 278 that is locked to locking geometry 296 of internal geared wheel 216, it fixes internal geared wheel 216 torsionally fixed in transmission housing 205.

Since internal geared wheels 206, 216 of front and middle planetary stages 270, 271 are held torsionally fixed in transmission housing 205 in the first gear of electric tool 100 of FIG. 1 by locking wheels 286 and 288, front and middle planetary stages 270 and 271 are thus activated in first gear. Accordingly, in first gear, the largest step-down achievable with planetary transmission 200 is effective, which is composed of a first partial step-down associated with middle planetary stage 271 and a second partial step-down associated with front planetary stage 270.

Figure 3:
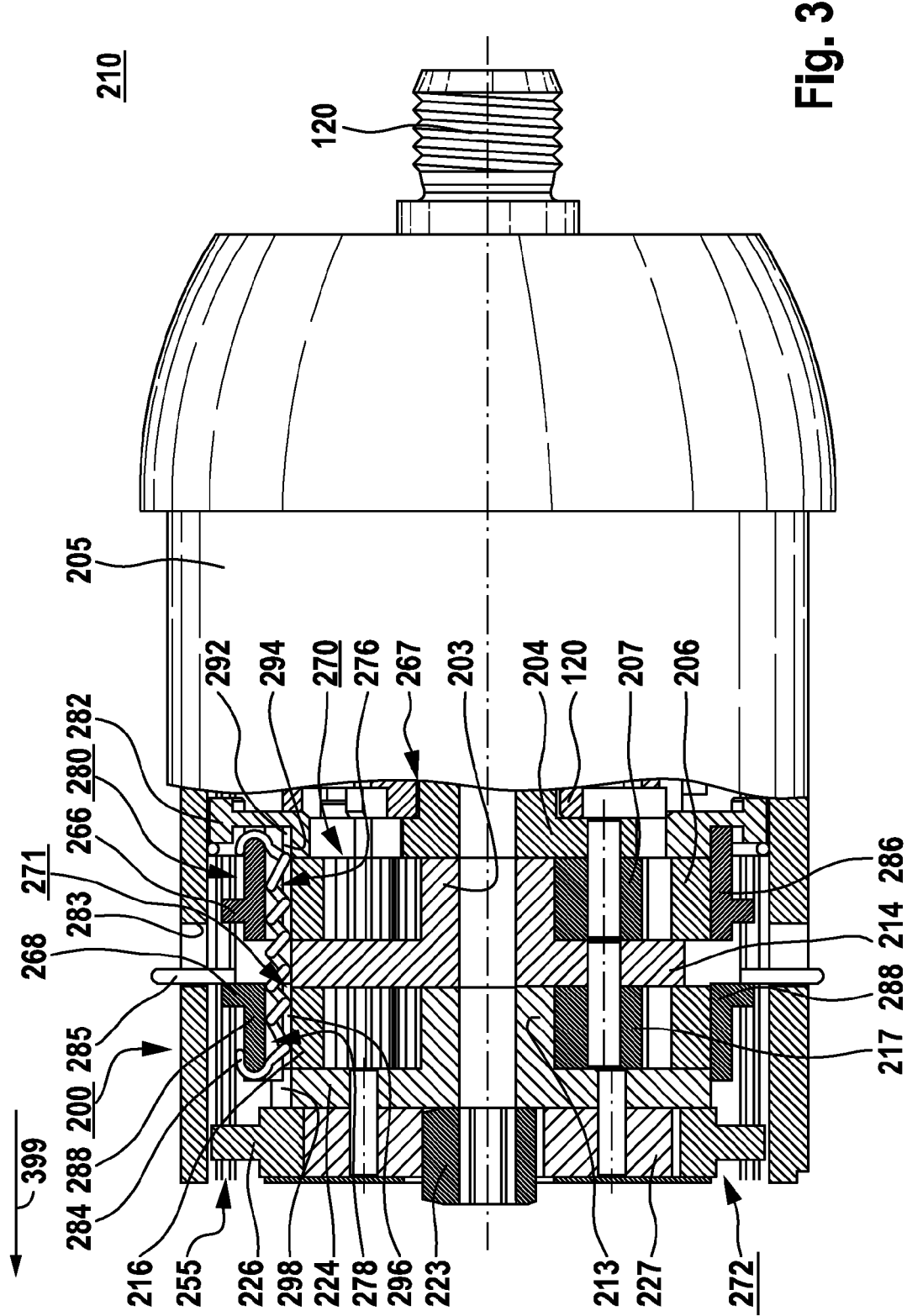
FIG. 3 shows the view of FIG. 2 during switchover of the planetary transmission from the slow gear having a high torque, via an associated intermediate gear, to a rapid gear having a low torque.

FIG. 3 shows section 210 of hand-held electric tool 100 of FIG. 1 during an exemplary switchover of planetary transmission 200 from first to second gear. In this instance, a second switching state is implemented which represents the intermediate gear of planetary transmission 200.

According to one specific embodiment, switching element 285 is shifted, for switching from first to second gear, from its position, shown in FIG. 2, axially in the direction of an arrow 399, in opening 283, into the position shown in FIG. 3. During the shifting, switching element 285 that lies against annular projection 268 takes first locking wheel 288 with it and displaces it from its first operating position, axially in the direction of arrow 399, into the second operating position. In this instance, form-locking connection 287, shown in FIG. 2, between first and second locking wheels 288, 286 is released, so that first locking wheel 288 is subsequently situated torsionally movable in transmission housing 205. In addition, locking counter-geometry 278 of first locking wheel 288 that is locked to locking geometry 296 of internal geared wheel 206 is locked to locking geometry 298 of planet carrier 224, so that first locking wheel 288 becomes connected torsionally fixed to planetary carrier 224. Consequently, first locking wheel 288, in the second switching state of planetary transmission 200, because of its torsionally fixed connection to internal geared wheel 216 and planetary carrier 224, deactivates middle planetary stage 271, while second locking wheel 286, as described for FIG. 2, is situated in its first operating position for activating front planetary stage 270. Accordingly, second partial step-down associated with front planetary stage 270 is effective, while first partial step-down associated with middle planetary stage 271 is noneffective in the second switching state.

According to one specific embodiment, during the displacement of switching element 285, and thus of first locking wheel 288 in the direction of arrow 399, spring element 284 is stressed. The latter now acts upon second locking wheel 286 in the direction of arrow 399, in order to displace it subsequently by a spring force, provided by spring element 284, from its first operating position, in the direction of arrow 399, to a second operating position, as will be described below for FIG. 4. As a result, planetary transmission 200 is automatically switched from the intermediate gear to the second gear. Consequently, the intermediate gear is able to be activated exclusively during switching over from the first to the second gear and vice versa for a short period of time respectively, so that electric tool 100 of FIG. 1 is not operable durably in this intermediate gear.

Figure 4:
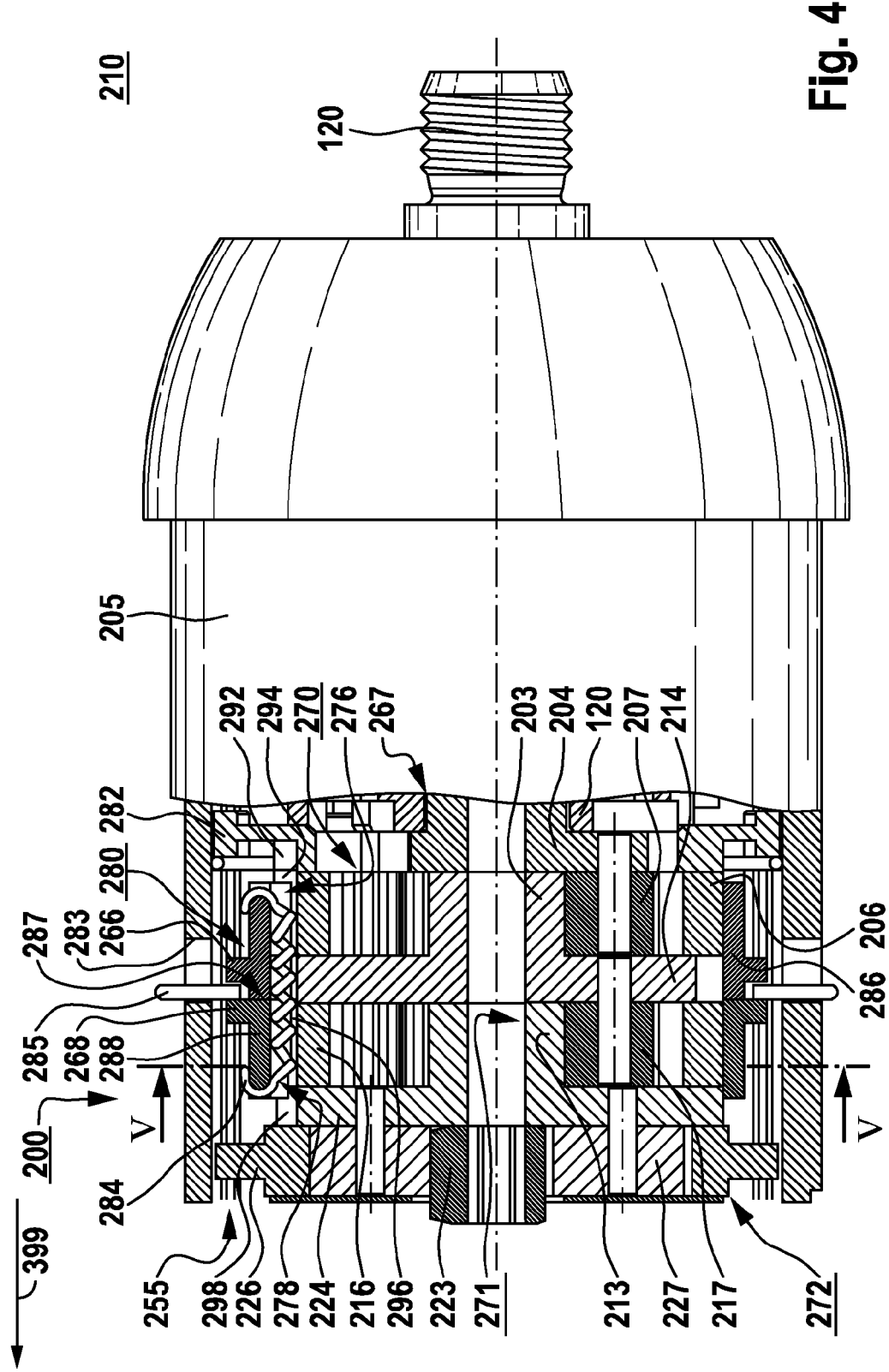
FIG. 4 shows the view of FIG. 3 during operation of the planetary transmission in the rapid gear having a low torque.

FIG. 4 shows section 210 of hand-held electric tool 100 of FIG. 1 in a third switching state, which implements the second gear. As may be seen in FIG. 4, second locking wheel 286 has been shifted, starting from the second switching state shown in FIG. 3, by the spring force provided by spring element 284, from its first operating position in the direction of arrow 399 into a second operating position, and is there newly connected in the third switching state via form-locking connection 287 to first locking wheel 288 in a torsionally fixed manner.

Both first and second locking wheels 288 and 286 are thus situated in the third switching state of planetary transmission 200 in transmission housing 205 torsionally movable, first locking wheel 288 deactivating middle planetary stage 271 by its torsionally fixed connection to internal geared wheel 216 and planet carrier, and second locking wheel 286 deactivating front planetary stage 270 by its torsionally fixed connection to first locking wheel 288 and internal geared wheel 206. Accordingly, in the third switching state, neither the first partial step-down associated with middle planetary stage 271 nor the second partial step-down associated with front planetary stage 270 is effective, so that the torque of planet carrier 224 of rear planetary stage 272 is indirectly transmitted to planet carrier 204 of front planetary stage 270, and the second gear is implemented thereby.

To switch over planetary transmission 200 from the second to the first gear, switching element 285 is shifted from its position in opening 283 shown in FIGS. 3 and 4 to a direction opposite to the direction of arrow 399, back into the position shown in FIG. 2, In this connection, switching element 285, that lies against annular projection 266, carries along second locking wheel 286 and thus shifts it axially from its second operating position back to its first operating position shown in FIG. 3, so that again the second switching state, shown in FIG. 3, is implemented, which implements the intermediate gear. Subsequently, first locking wheel 288, by the force supplied by spring element 284, is shifted from its second operating position, shown in FIGS. 3 and 4, back into its first operating position shown in FIG. 2, so that the switchover into the first switching state shown in FIG. 2, which implements the first gear, is automatically closed.

Figure 5:
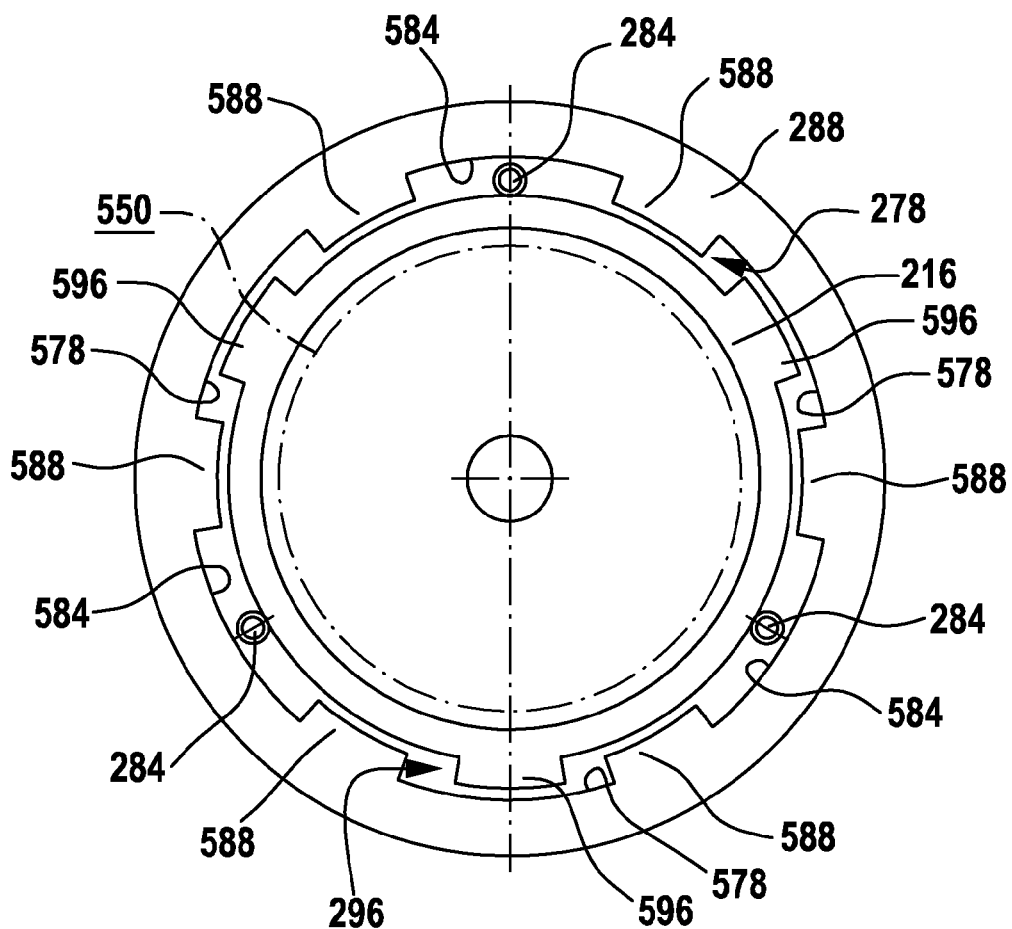
FIG. 5 shows a sectional view of a planetary stage of the planetary transmission of FIG. 4.

FIG. 5 shows a sectional view 500, having first locking wheel 288 of FIG. 4, which is locked to locking geometry 296 of internal geared wheel 216 of FIG. 4, via its locking counter-geometry 278. In this connection, for instance, planet pinion 217 and sun wheel 213 of middle planetary stage 271 of FIG. 4 have been illustrated only schematically, for the sake of simplicity and clarity of the representation, by a dash-dotted circle that is characterized by 550.

According to one specific embodiment, locking geometry 296 of internal geared wheel 216 has, provided at its circumference, at least one outwardly directed tooth 596 which, for example, is developed in the axial direction of internal geared wheel 216 as a crosspiece. Three outer teeth 596 are provided illustratively. Locking counter-geometry 278 of first locking wheel 288 has at least two inner teeth 588 provided at its inner circumference that are directed radially inwards, which are developed, for example, in the axial direction of locking wheel 288 in the form of crosspieces. Six inner teeth 588 are provided illustratively. Inner teeth 588 form at least one groove-like recess 584 for accommodating spring element 284 of FIGS. 2 through 4. Inner teeth 588 illustratively form three recesses 584, in which three spring elements 284 are situated. In addition, inner teeth 588 form at least one groove-like recess 578 for accommodating the at least one outer tooth 596, in order thus to make possible the locking of first locking counter-geometry 278 of first locking wheel 288 to locking geometry 296 of internal geared wheel 216. Inner teeth 588 illustratively form three recesses 578, in which the three outer teeth 596 engage.

It should be pointed out that the representation of exemplary locking geometry 296 and of exemplary locking counter-geometry 278 should be understood as being representative of all the locking geometries and locking counter-geometries described in connection with FIGS. 2 through 4. They may thus be developed to be at least similar.

What is claimed is:

1. A hand-held electric tool, comprising:
a transmission situated in a transmission housing; and
an operable switching device configured to switch the transmission at least between a first gear having a high torque and a second gear having a low torque, wherein for switching between the first and second gears, at least one intermediate gear is associated with the transmission, and wherein the electric tool is not able to be operated durably in the at least one intermediate gear, the operable switching device being configured to enable a gear switchover between the first and second gears via the at least one intermediate gear.

2. The electric tool as recited in claim 1, wherein the transmission is configured as a planetary transmission having at least one first planetary stage, one second planetary stage, and one third planetary stage.

3. The electric tool as recited in claim 2, wherein the operable switching device is configured to switch over the planetary transmission from the first gear to the second gear by sequential deactivation of at least two of the planetary stages.

4. The electric tool as recited in claim 2, wherein the operable switching device is configured to switch over the planetary transmission from the second gear to the first gear by sequential deactivation of at least two of the planetary stages.

5. The electric tool as recited in claim 2, wherein for activating and deactivating the second and third planetary stages, the operable switching device has at least one first locking wheel and one second locking wheel which act upon each other in an axial direction of the planetary transmission via an associated spring element.

6. The electric tool as recited in claim 5, wherein the operable switching device has a switching element configured to enable one of (i) a shifting of the first locking wheel relative to the second locking wheel, or (ii) a shifting of the second locking wheel relative to the first locking wheel, in the axial direction of the planetary transmission against a spring force provided by the spring element.

7. The electric tool as recited in claim 6, wherein:
the first locking wheel is able to be shifted in the axial direction of the planetary transmission from a first operating position to a second operating position;
the first operating position is associated with the first gear;
the second operating position is associated with the intermediate gear and the second gear;
the first locking wheel in the first operating position is (i) connected torsionally fixed to an internal geared wheel associated with the second planetary stage, and (ii) indirectly connected to the transmission housing; and
the first locking wheel in the second operating position is connected torsionally fixed to a planet carrier associated with the first planetary stage and to the internal geared wheel associated with the second planetary stage.

8. The electric tool as recited in claim 6, wherein:
the second locking wheel is able to be shifted in the axial direction of the planetary transmission from a first operating position to a second operating position;
the first operating position is associated with the first gear and the intermediate gear;
the second operating position is associated with the second gear;
the second locking wheel in the first operating position is connected torsionally fixed to an internal geared wheel associated with the third planetary stage and to the transmission housing; and
the second locking wheel in the second operating position is connected torsionally fixed to the internal geared wheel associated with the third planetary stage.

9. The electric tool as recited in claim 8, wherein the second locking wheel in the second operating position is connected torsionally fixed to a locking disk which is fastened torsionally fixed and axially immovable in the transmission housing.

10. The electric tool as recited in claim 6, wherein the first and second locking wheels are fastened to each other in the first and second gears of the planetary transmission in a form-locking connection which is fixed by a spring force provided by the spring element.

11. The electric tool as recited in claim 6, wherein the first and second locking wheels are at a distance from each other in the intermediate gear of the planetary transmission, against a spring force provided by the spring element, in the axial direction of the planetary transmission.

12. The electric tool as recited in claim 6, wherein the first and second locking wheels are situated torsionally fixed in the transmission housing in the first gear of the planetary transmission.

13. The electric tool as recited in claim 6, wherein the first and second locking wheels are situated torsionally movable in the transmission housing in the second gear of the planetary transmission.

14. The electric tool as recited in claim 6, wherein the first locking wheel is situated torsionally movable in the intermediate gear of the planetary transmission in the transmission housing, and the second locking wheel is situated torsionally fixed in the intermediate gear of the planetary transmission in the transmission housing.

15. A transmission for an electric device, comprising:
a first gear having a high torque, a second gear having a low torque, and an intermediate gear in which the electric device is not durably operable: and
an operable switching device configured to enable switching between the first gear and the second gear via the intermediate gear.

* * * * *